APPARATUS FOR READING

Filed Dec. 17, 1953 4 Sheets-Sheet 1

INVENTOR
David H. Shepard
BY Mason, Fenwick & Lawrence
ATTORNEYS

July 28, 1959 D. H. SHEPARD 2,897,481

APPARATUS FOR READING

Filed Dec. 17, 1953 4 Sheets-Sheet 2

INVENTOR
David H. Shepard

BY Mason, Fenwick & Lawrence
ATTORNEYS

July 28, 1959 D. H. SHEPARD 2,897,481

APPARATUS FOR READING

Filed Dec. 17, 1953 4 Sheets-Sheet 3

INVENTOR
David H. Shepard

BY Mason, Fenwick & Lawrence
ATTORNEYS

INVENTOR
David H. Shepard

BY Mason, Fenwick & Lawrence
ATTORNEYS

United States Patent Office 2,897,481
Patented July 28, 1959

2,897,481

APPARATUS FOR READING

David H. Shepard, Falls Church, Va., assignor to Intelligent Machines Research Corporation, Arlington, Va., a corporation of Maryland Application December 17, 1953, Serial No. 399,227

19 Claims. (Cl. 340—149)

The present invention relates in general to methods and apparatus for interpreting intelligence and activating selected ones of a variety of output devices in accordance with decisions made on the basis of information sensed from the intelligence, and more particularly to devices having one or more input sensing units which scan items of information, recognize the items of information on the basis of selected unique qualities thereof, and operate output apparatus in accordance with the item of information recognized.

Briefly, the present invention relates to interpreter apparatus of the type arranged for scanning signals or items of information such as printed characters, Morse Code characters, and other intelligence-bearing items with respect to a variable time base, detecting the presence or absence of unique configurations of the intelligence-bearing signals, interpreting the presence or absence of unique configuration signals to recognize the signal or item of information, and presenting the recognition decision to an output device to record or reproduce the signal recognized. The invention has application particularly to the production of machines which will accept signals from an input device which is scanning a printed page such as a typewritten page and producing signals in accordance with unique features of the characters being scanned and ignoring unimportant features, interpret the signals to determine the unique identity of each character being scanned by the input device, and produce coded signals representing the character identified to an output device such as a card punching device, a tape punching device, an electronic computer, or any other output unit which may be operated from coded information.

An object of the present invention is the provision of novel apparatus for interpreting signals produced in accordance with selected portions only of intelligence-bearing characters as unique configurations, recognizing the unique configurations, and reproducing the intelligence-bearing items, which is adaptable to interpret a wide variety of configurations with accuracy on the basis of selected portions only of the configuration.

Another object of the present invention is the provision of improved reading apparatus for sensing and interpreting information-bearing characters which avoids the limitation on speed and accuracy of reading and interpreting incident to mechanical scanning means which scans portions only of the characters to recognize the same through detection of unique characteristics thereof, without the use of mechanical scanning components.

Another object of the present invention is the provision of improved reading apparatus for sensing and interpreting information-bearing characters which avoids the limitation on speed and accuracy of reading and interpreting incident to storage of shapes to be recognized on a mechanical scanning disk through the use of separate programmed electronic storage units which store equivalent information.

Another object of the present invention is the provision of improved reading apparatus for distinguishing intelligence-bearing characters from unique characteristics of portions thereof and reproducing the same, which is adapted to be selectively programmed to recognize a wide variety of intelligence-bearing items.

Another object of the present invention is the provision of apparatus for reading and interpreting intelligence-bearing characters, in which means are provided to automatically position the area scanned by the device in accordance with the extent and location of the characters to be read.

Another object of the present invention is the provision of interpreting apparatus for use with an input device which scans items of information and produces electrical signals in accordance with unique characteristics of portions of the items, which is capable of recognizing the item of information even though it may be disfigured, incomplete, or incorrectly aligned with respect to the input scanning device.

Another object of the present invention is the provision of apparatus for interpreting items of information from electrical signals produced in accordance with unique characteristics of the items by an input scanning device, in which the interpreting apparatus is adapted to be readily programmed to sense and recognize different sets of facts pertaining to the viewed configurations, which facts relate the various segments of a character to each other rather than to the scanning base and thus do not depend on alignment.

Other objects, advantages and capabilities of the present invention will become apparent from the following detail description, taken in conjunction with the accompanying drawing, showing only a preferred embodiment of the invention.

Figure 11:
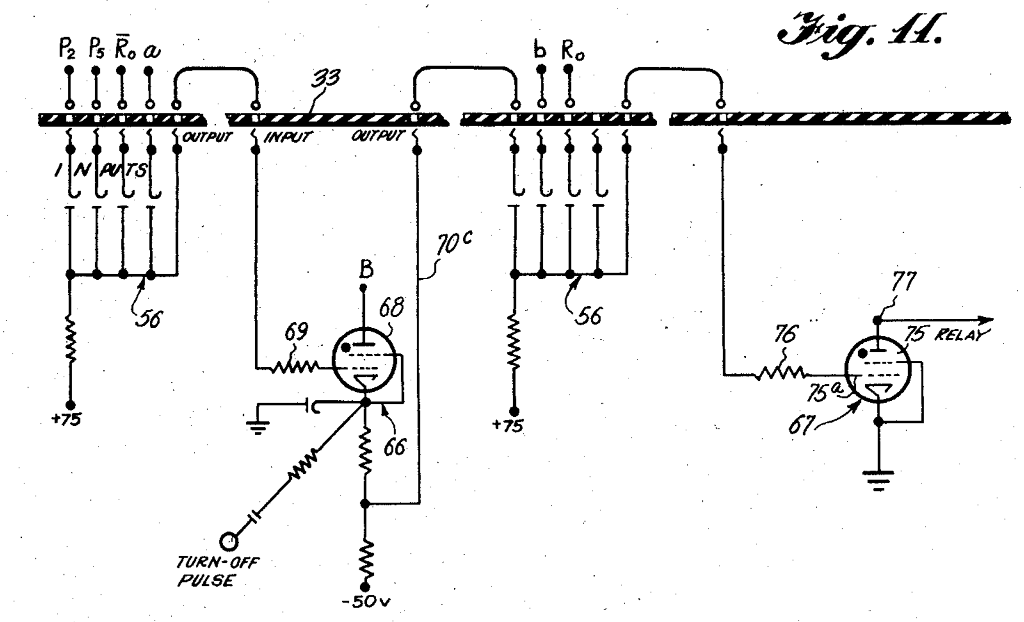
Figure 12:
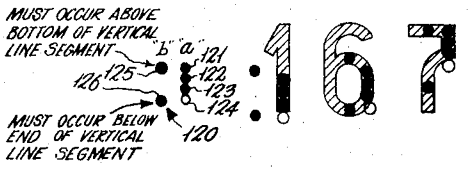

Figure 11 is a schematic diagram illustrating the manner in which comparator circuits of the decision unit and thyratron circuits of the Temporary Memory unit are intercoupled in accordance with one phase of a program; and Figure 12 is an illustration of a shape detection pattern of one of the shape memory stages of the Temporary Memory unit shown with a group of numbers of an exemplary font of type which the pattern is designed to distinguish.

The following detailed description, had with reference to the accompanying drawing, wherein like reference characters designate corresponding parts throughout the several figures, is of a preferred embodiment of the invention only, wherein the apparatus is programmed to scan, detect, interpret and reproduce numerical characters from zero to nine read from typewritten characters on a sheet of paper bearing such numbers. It is to be understood, however, that the apparatus in practice is programmed to read all alphabetical characters, numbers from zero to nine, and a number of preselected punctuation marks, or other characters such as arbitrary characters designed to instruct the apparatus to perform certain functions, the following description being confined to a program for reading numbers from zero to nine merely for the purpose of simplifying the description and facilitating a clear understanding of the invention.

The device is particularly designed to read typewritten characters on a sheet of paper starting at the upper left-hand corner of the page and identifying each character in turn, reading from left to right through each succeeding line, and to automatically edit the typewritten sheet and advance the same through recognition of certain characters especially assigned to these functions.

Figure 1:
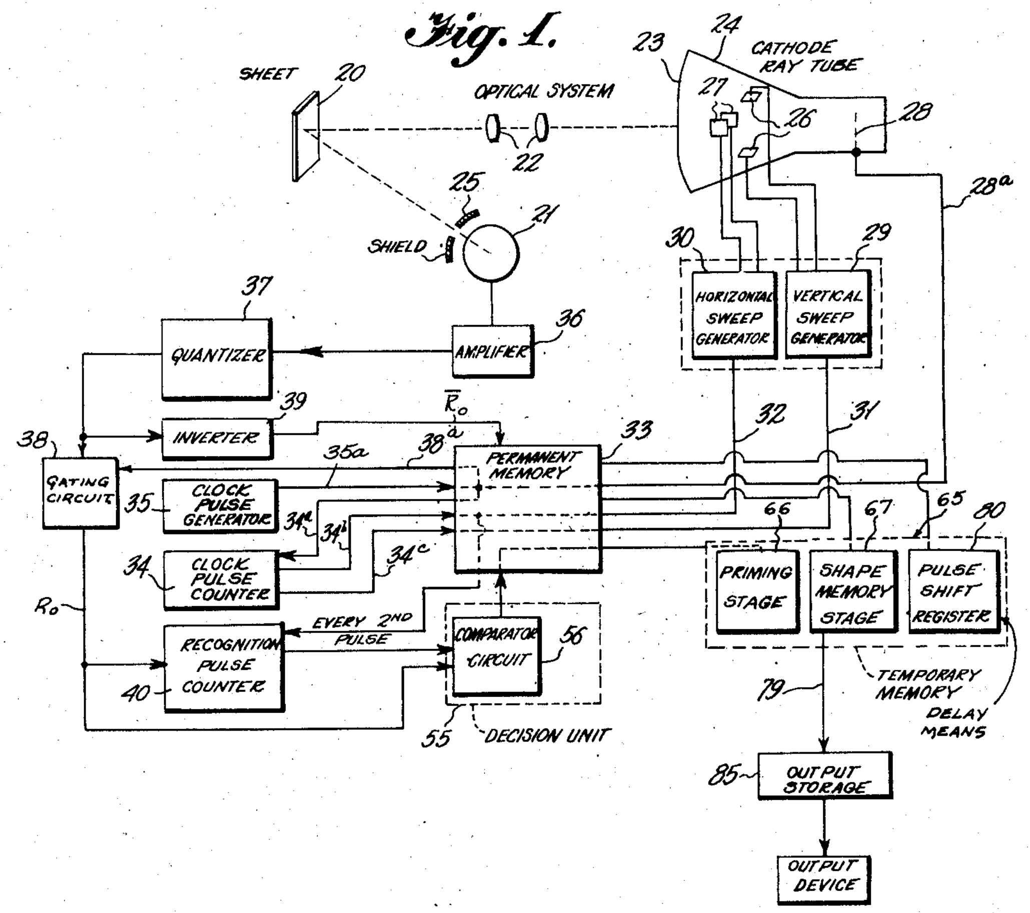
Figure 1 is a schematic illustration of the mechanical components and a block diagram of the electrical circuits employed in my invention.
Figure 2:
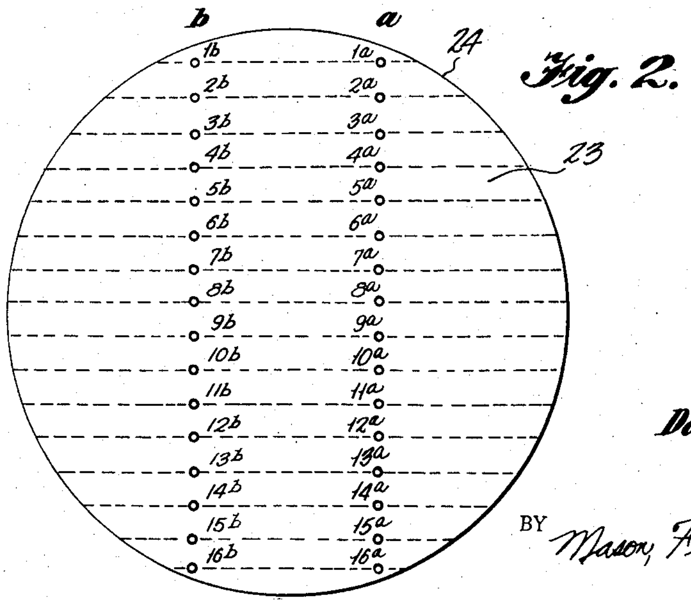
Figure 2 is an illustration of the scanning pattern traced out by the electron beam in scanning visible items of information in accordance with the present invention, together with the points along the scanning path at which the electron beam is gated to produce spots of light.

Referring particularly to Figures 1 and 2 of the drawing, a sheet of paper 20 bearing characters to be read by the apparatus which, for the purpose of this description will be typewritten numbers from zero to nine, is to be fed through the field of view of a light sensitive device 21 such as a multiplier photoelectric cell. The photoelectric cell 21 is designed to receive light imaged upon the sheet 20 by a suitable optical system 22 and emanating from the screen 23 of a cathode ray tube 24. The light from the screen 23 of the cathode ray tube 24 which is imaged on the character-bearing sheet 20 is reflected from the surface of the sheet 20 through a suitable shield 25 disposed between the sheet 20 and the photoelectric cell 21 except when light focused by the optical system 22 on the sheet 20 falls upon a portion of a printed character, the shield 25 being provided to shield the light sensitive element of the photoelectric cell 21 from spurious light rays.

The cathode ray tube 24 employed in the scanning unit of the present invention is of the conventional type supplied with pairs of vertical and horizontal electrostatic deflection plates 26 and 27, respectively, and an intensity control grid 28 for gating the electron beam produced by the electron gun of the cathode ray tube 24. Saw tooth voltage wave forms are supplied to the pair of vertical and horizontal deflection plates 26 and 27 from conventional vertical and horizontal sweep generator circuits 29 and 30 in preselected time relation to produce a plurality of horizontal scanning lines resembling the scanning routine used in commercial television, resulting in the scanning pattern illustrated in Figure 2.

The vertical and horizontal sweep generator circuits 29 and 30 are each triggered through leads 31 and 32, respectively, plugged to sockets in a programming plugboard for establishing the circuit conditions of the particular program of the unit, indicated at 33 in the drawing and entitled "Permanent Memory." The leads 31 and 32 plugged to sockets in the plugboard 33 are conductively jumped to sockets to which "scale of 32" and "scale of 2" pluses, respectively, are fed from appropriate leads **34*b* and 34*c* extending from a clock pulse counter unit 34, which will be later described in greater detail. In general, the clock pulse counter 34 consists of a number of cascaded "flip-flop" circuits producing pulses at preselected binary multiples of a continuous stream of pulses produced at a preselected constant pulse reptition frequency by a clock pulse generator 35. This preferably consists of multivibrator circuits arranged to generate a chain of well shaped pulses at a frequency of 25 kilocycles per second, which are supplied to a socket on the plugboard 33 through a lead 35*a*, to which the input lead 34*a* of the counter unit 34 is jumped at the plugboard 33**.

As this description progresses, it will be noted that all electrical connections having relation to timing or discriminating functions in the device are brought through the "Permanent Memory" which in this embodiment takes the form of the plugboard 33, thus providing a readily available facility whereby the circuits can be conveniently changed to program the device for a wide variety of conditions.

It will be seen that as the horizontal and vertical sweep generators 30 and 29 are triggered by every second pulse and every thirty-second pulse, respectively, produced by the clock pulse counter unit 34, the electron beam produced in the cathode ray tube 24 will be swept over its phosphor-coated screen 23 in a series of parallel horizontal lines progressing from the top to the bottom of the screen, as illustrated by the dotted lines on Figure 2. This triggering of the horizontal and vertical sweep generators 30 and 29 preferably occurs 180° out of phase with occurrence of the pulses at the output of the pulse generator 35, which phase shift may be introduced in the input of the sweep generators in any suitable manner, for example, by a single-shot multivibrator. The exact number of horizontal lines to be swept across the cathode ray tube screen 23 may vary from program to program, but for the purposes of the preferred embodiment herein described, sixteen horizontal scanning lines have been employed.

To produce a scanning raster on the screen of the cathode ray tube 24 with reference to which selected spaced points on the character area of the screen 20 may be analyzed, the intensity grid 28 of the cathode ray tube 24 in one preferred embodiment of the invention is normally biased below cut-off, and is intercoupled through lead **28*a* to a terminal on the "Permanent Memory" plugboard 33 which is bridged to a lead 35*a* carrying each pulse generated by the clock pulse generator 35 at the pulse repetition frequency of the generator 35. The pulses on the leads 31 and 32 triggering the vertical and horizontal sweep generators 29 and 30, however, are delayed in phase relative to the pulses coupled through the lead 28*a* to the cathode ray tube grid 28**, in the manner previously referred to, so as to produce a pair of horizontally spaced groups *a* and *b* of vertically aligned spots of light **1*a* to 16*a* and 1*b* to 16*b*, spaced symmetrically relative to the vertical medial axis of the cathode ray tube screen 23**.

These vertically aligned groups *a* and *b* of spots constitute the scanning raster for the apparatus, with reference to which selected points along each character on the sheet 20 are analyzed to permit identification of the character. The image of the cathode ray tube raster thus produced is projected through the optical system 22 onto the character-bearing area of the paper 20 to be read, and is adjusted to such a size that the vertical height of the scanning raster is greater than the tallest character to be scanned and the width of the raster is approximately equal to half of the width of the average character to be scanned. In a preferred embodiment the raster is adjusted in size so that the height of the digits or characters occurring on the printed sheet covers ten to twelve lines along the scanning raster. This provides a limited degree of vertical adjustment for misalignment of characters. In another embodiment, a scanning raster of twenty to twenty-four lines has been used for characters covering ten to twelve lines to give greater adjustment.

Whenever an uninked portion of the sheet 20 is traversed by the scanning beam at a point in time corresponding to the projected image of a spot on the scanning raster, a substantial portion of the light impinging upon the sheet will be reflected to the photocell 21 causing a pulse of increased current and resulting in a negative going voltage pulse of substantial amplitude in the photocell output. Whenever an inked portion of a character on the sheet 20 is similarly traversed by a scanning spot, a much smaller portion of the impinging light will be reflected to photocell 21 and the resulting negative going photocell output voltage pulse will be of greatly reduced amplitude. Those portions of the sheet 20 which are traversed by the scanning beam, but which do not correspond in time to spots on the scanning raster, have no effect on the photocell output since during these times, no light will be emitted, and no light reflected. Only the "dark current" will flow in the photocell 21 and its output lead will be substantially at the positive supply potential. Thus the output of photocell 21 will be characterized by a high positive potential on which are entrained negative pulses of relatively large amplitude resulting from scanning the uninked portions of the sheet 20 and negative pulses of greatly reduced amplitude resulting from scanning inked portions. These photocell output pulses are coupled to an amplifier 36 which amlifies the intensity of the pulse to a usable value, and which preferably is controlled by conventional automatic gain control means responsive to the intensity of the incoming signal over a period of time to automatically increase the gain of the amplifier 36 as the input signal weakens.

Coupled to the output of the amplifier 36 is a quantizer or voltage discriminator 37, which may be a conventional amplifier stage having a preselected bias on the input grid permitting the tube of that stage to conduct and produce an output signal only when the voltage of the pulse coupled thereto from the amplifier 36 is above a critical threshold voltage which is arbitrarily set to correspond to a desired darkness or contrast level anticipated in the reading problem. The quantizer 37 therefore produces a constant voltage output pulse when a valid "hit" or inked area is detected by the photocell 21.

The quantizer 37 therefore produces a constant positive voltage output both during the intervals between scanning spots and during those scanning spots when a valid "hit" or inked area is detected by the photocell 21. Negative pulses will be entrained in the output of quantizer 37 when either the uninked portions of sheet 20 or inked portions of less than the desired darkness or contrast level are intercepted by the scanning raster spots.

Means are provided for producing a positive output pulse whenever an inked character portion is detected for one of the spots of the scanning raster. To this end, the train of clock pulses produced by the clock pulse generator 35 is coupled from the plug board 33 to one input of a gating circuit 38 through lead 38*a* and the output of quantizer 37 is applied to the other input of the gating circuit 38. The gating circuit 38 is preferably a multi-grid vacuum tube having the clock pulse on one grid and the quantizer negative output pulses on the other grid, the tube being biased to conduct only when the quantizer output is positive simultaneously with the arrival at the gating circuit 38 of a clock pulse. The output pulse of gating circuit 38 constitutes a "recognition pulse" designated "$R_0$" in the embodiment described above and is analyzed in connection with certain other "recognition pulses" and a known time base to identify the character or number being read.

Means are also provided for producing an output pulse when no inked character portion is detected for one of the spots on the scanning raster. A conventional inverter 39 serves to reverse the polarity of the output signals of quantizer 37 which are coupled to its input. The negative pulses of quantizer 37 corresponding to detection of uninked or portions of less than desired darkness for spots of the scanning raster will cause positive pulses in the output of inverter 39. At all other times when the output of quantizer 37 is positive, inverter 39 will be caused to have a negative output potential. The positive output pulse of inverter 39 is termed a "non-recognition pulse" and is designated "$\bar{R}_0$."

A cascade of binary counters stepped by the clock pulses produced by the clock pulse generator 35 might be employed as the sole counter unit in this system, producing pulses on separate output leads as the count advances through each scanning cycle in accordance with occurrence of the spots in the scanning raster to provide a pulse time base by which the particular spot of the scanning raster from which the hit occurred could be identified. Such an arrangement, however, introduces serious alignment problems into the identification of characters as accurate interpretation could be achieved only when the characters are precisely aligned in a particular relation to the scanning raster.

Figure 3:
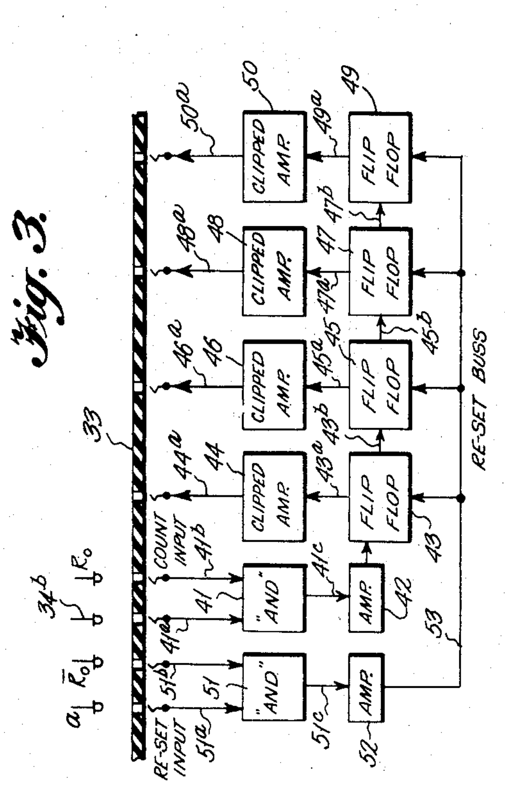
Figure 3 is a block diagram indicating the circuit arrangement of the recognition pulse counter employed in connection with the present invention.

In order to avoid this alignment problem, a recognition pulse counter 40 is provided which counts recognition pulses produced at the output of gating circuit 38 arising from only one vertical group of spots on the scanning raster: for example, only recognition occurring in the group of spots 1*a* to 16*a*. The components making up such a recognition pulse counter are illustrated in Figure 3.

The input stage of the recognition pulse counter 40 comprises an "and" circuit 41, of the type which is commonly known and used in electronics computer design, which is sensitive to the polarity and time relation of two or more input signals to produce an output signal when all input signals occur simultaneously. An "and" circuit which is satisfactory for this input stage 41 may consist of a pair of germanium diodes formed of 1N34 crystals arranged in parallel with the plates coupled through a resistor to a preselected positive voltage source and the cathodes coupled directly to separate sockets in the plug board 33. Every second pulse produced by the clock pulse counter 34 and synchronized with the spots 1*a* to 16*a* of the scanning raster, obtained for example from the lead 34*b*, is coupled to one of the cathode leads 41*a* of the "and" circuit 41, and the recognition pulse at the output of the gating circuit 38 is coupled to the other cathode lead 41*b*.

When the first recognition pulse and one of the pulses synchronized with the spots 1*a* to 16*a* arrive simultaneously at the "and" circuit 41, a maximum voltage output pulse occurs on the output lead 41*c* of the "and" circuit, since no diode is holding the voltage down. This output pulse is amplified by a conventional amplifier 42 and coupled to the input of a conventional "flip-flop" circuit 43, triggering the "flip-flop" circuit. The pulse produced in the "flip-flop" circuit on the occurrence of the maximum voltage pulse at the output of the "and" circuit 41 is coupled through the lead 43*a* to the clipped amplifier 44, which clips the pulses at plus 25 volts and minus 25 volts. The clipped pulses are then supplied through output lead 44*a* to a socket of the plugboard 33 to be available for use in other parts of the system.

The "flip-flop," in accordance with conventional practice, comprises a pair of triodes connected as a balanced trigger circuit, wherein either triode may be conducting current while the other is cut off. When a preselected pulse of voltage is applied to the circuit, the conditions of conduction- non-conduction are reversed and remain so until the application of another like pulse at the same input point.

The recognition pulse counter comprises four identical stages of "flip-flop" circuits 43, 45, 47 and 49. Each stage is coupled to the input point of the next succeeding stage so that two reversals in any given stage will result in a single reversal in the next succeeding stage. Thus the "scale of 2" pulses produced at one plate of the "flip-flop" stage 43 are coupled through output lead 43*b* to the second "flip-flop" stage 45. The "scale of 4" output pulses at one plate of the "flip-flop" stage 45 are coupled through output lead 45*a,* a clipped amplifier 46 identical with the clipped amplifier 44, and output lead 46*a* to another socket of the plug board 33. Similarly, the "scale of 4" pulses at the other plate of the "flip-flop" stage 45 are coupled through lead 45*b* to a third "flip-flop" stage 47, the "scale of 8" pulses on one plate being coupled through lead 47*a,* clipped amplifier 48 and output lead 48*a* to another socket of the plug board 33, and the "scale of 8" pulses produced at the other plate of the "flip-flop" stage 47 are coupled through lead 47*b* to a fourth "flip-flop" stage 49, "scale of 16" pulses produced thereby being coupled through output lead 49*a,* clipped amplifier 50 and output lead 50*a* to another socket of the plug board 33.

Additionally, a reset circuit is associated with each of the "flip-flop" stages 43, 45, 47 and 49, to terminate the count and reset the "flip-flop" stages to zero the first time that no recognition pulse is received in the group of raster spots 1*a* to 16*a*. This reset circuit comprises an "and" circuit 51 identical with the "and" circuit 41, having input leads 51*a* and 51*b* respectively coupled to separate sockets of the plug board 33, the lead 51*a* receiving pulses synchronized with each one of the spots 1*a* to 16*a,* indicated by the letter "*a*" and lead 51*b* receiving a non-recognition pulse denoted "$\overline{R_0}$," produced by the inverter 39 when no recognition pulse is received at the time of sampling. The positive output pulse produced by the "and" circuit 51 on simultaneous occurrence of these two pulses is fed through lead 51*c* to an amplifier 52, where the pulse is amplified to an appropriate value and coupled through lead 53 to each of the "flip-flop" stages 43, 45, 47 and 49 to reset the "flip-flop" stages to zero.

The recognition counter circuit therefore produces an output voltage at the plug board socket connected to lead 44*a* which changes polarity at every consecutive recognition pulse occurring in coincidence with one of the vertical group of spots 1*a* to 16*a*, an output voltage at the plug board socket connected to lead 46*a* which changes polarity at every second consecutive recognition pulse occurring in sequence in coincidence with the raster spots 1*a* to 16*a*, a voltage at the plug board socket connected to lead 48*a* which changes polarity at every fourth consecutive recognition pulse occurring in sequence in coincidence with the raster spots 1*a* to 16*a,* and a voltage at the plug board socket connected to lead 50*a* which changes polarity at every eighth consecutive recognition pulse occurring in sequence in coincidence with the raster spots 1*a* to 16*a*. The voltages coupled to the plug board sockets from the amplifiers 44, 46, 48 and 50 are detected by conventional circuitry to establish the counts of successive $R_0$ pulses in accordance with the binary number system. All these voltages, when reset, return to a negative potential.

Voltages occurring on the plates of each of the "flip-flop" stages 43, 45, 47 and 49 which are opposite the voltages brought to the plug board 33 through leads 43*a*, 45*a*, 47*a* and 49*a* may also be brought directly to the plug board 33 for use in other parts of the system.

From the apparatus above described, it will be seen that the electron beam of the cathode ray tube 24 is scanned by voltage applied to the electrostatic deflection plates 26 and 27 and gated by the voltage on the intensity grid 28 to produce the vertical group of spots of light 1*a* to 16*a* and the laterally spaced vertical group of spots of light 1*b* to 16*b* on the phosphor screen of the cathode ray tube. These spots will be imaged on the character area of the sheet 20 by the optical system 22. When the projected image of any of the spots of light 1*a* to 16*a*, 1*b* to 16*b*, strikes a portion of a character on the sheet 20, which will be dark and therefore of lower reflectivity than the sheet 20, the reduced intensity of the light reflected to the photocell 21 produces an output voltage which is amplified by the amplifier 36 and fed to the quantizer 37 which enables the gating circuit 38 to produce an output pulse termed a "recognition pulse" when the voltage is greater than a preselected critical threshold voltage which is arbitrarily set to correspond to a desired darkness or contrast level. Therefore, for each spot 1*a* to 16*a* and 1*b* to 16*b* which encounters a portion of the intelligence-bearing characters on the sheet 20, a recognition pulse $R_0$ is provided at the output of the gating circuit 38 which is fed to the recognition pulse counter 40 by which successive recognition pulses $R_0$ are counted and outputs produced appropriate to the count. The recognition pulses $R_0$ at the output of the gating circuit 38 are also illustrated in Figure 1 as coupled directly to comparator circuits 56 of the decision unit 55, although for convenience these may be coupled through the plug board 33 to facilitate rewiring of the system in accordance with different programs. Also, whenever any of the spots 1*a* to 16*a* and 1*b* to 16*b* fail to strike a portion of a character on the sheet 20 so that no output pulse is produced by the photocell 21, a non-recognition $\overline{R_0}$ is provided at the output of the inverter 39 in the manner previously described and is fed to the plug board 33. In this manner, recognition pulses $R_0$, non-recognition pulses $\overline{R_0}$, and recognition pulse counter output pulses indicative of the number of successive recognition pulses counted are available to be analyzed by various comparator or "and" circuits 56 of the decision unit 55 as to the sequence and recurrence of the recognition and non-recognition signals and the relative time spacing of the same to facilitate interpretation of the signals and detection of the identity of the character.

A decision unit, indicated by the reference character 55, is provided in the apparatus to analyze the recognition and non-recognition pulses produced by the quantizer 37 and gating circuit 38, respectively, in conjunction with selected ones of the pulses produced on the output leads 44*a*, 46*a*, 48*a* and 50*a* of the recognition pulse counter 40 to determine which of certain conditions predicted in the program established for the apparatus exist with respect to a given character and produce an appropriate output signal.

Figure 4:
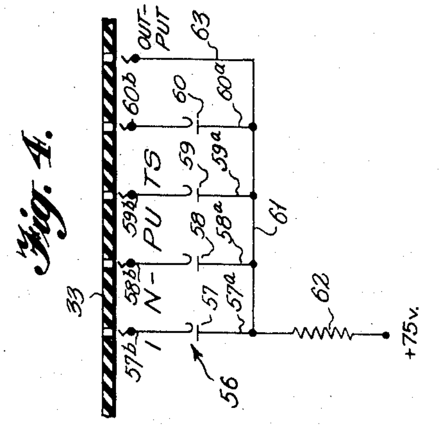
Figure 4 is a schematic diagram of a comparator or "and" circuit employed in the decision unit of the present invention.

The decision unit consists of a large number of identical comparator or "and" circuits, indicated by reference character 56, a schematic diagram of one of which is illustrated in Figure 4. Each of the comparator circuits 56 preferably consists of four germanium diodes 57, 58, 59 and 60, which may be 1N38 diode crystals available on the commercial market, the plate of each of which is connected through leads 57*a* to 60*a*, a common buss 61, and resistor 62 to a positive 75 volt source. The cathodes of each of the germanium diodes 57 to 60 are coupled through leads 57*b* to 60*b* to separate sockets of the plug board 33. An additional lead 63 extends from the common buss 61 to which each of the anodes are connected to a fifth socket of the plug board 33. It will be apparent therefore that leads extending from the output of the stages producing the recognition and non-recognition pulses or from the outputs of priming thyratron stages, to be later described, and leads extending from various other points in the system such as selected ones of the output pulses of the recognition pulse counter 40, may be coupled to selected ones of the sockets connected to the cathode leads 57*b* to 60*b* of any one of the comparator circuits 56. If the several pulses are of the same positive polarity and occur simultaneously, all the pulses being assumed to be of equal voltage, the reduced IR drop through the common resistor 62 will produce a positive voltage pulse at the socket connected to the output lead 63.

In order to temporarily store information provided by the other units of the system, particularly the comparator circuits 56, as when a comparator circuit has produced an output on simultaneous reception of a recognition pulse and a specific counter output pulse, the present system is provided with a group of circuits forming what will be termed a "temporary memory," indicated by reference character 65. The functions of this temporary memory unit 65 are to store up in binary coded form information presented in the form of output pulses from other units and give up the information in the form of a positive or negative output voltage or "picking up" or "not picking up" a relay at a selected time in the operating cycle, and to change the information stored by erasing the previous information stored and store new information presented by some unit of the system. One example of the type of information which the temporary memory unit can store is a binary indication of which specific shapes or strokes which may be looked for to identify a character have occurred since the beginning of the scan of a particular character being read. Another example is the sequence of occurrence of such strokes.

The storage medium employed in the temporary memory may be vacuum tubes, a magnetic drum, magnetic binaries, a cathode ray tube, delay lines, relays, or like storage means known in the electronic computer arts. In the preferred embodiment herein disclosed, however, the temporary memory 65 is made up of a plurality of thyratrons triggered by the decision unit 55. The thyratron circuits of the temporary memory unit 65 are preferably of two types, designated priming stages 66 and shape memory stages 67. In a preferred embodiment, twenty identical priming stages 66 and twenty identical shape memory stages 67 are provided to be coupled through the plug board 33 with selected ones of the comparator circuits 56 and other units of the system in accordance with the program of the system.

Figure 5:
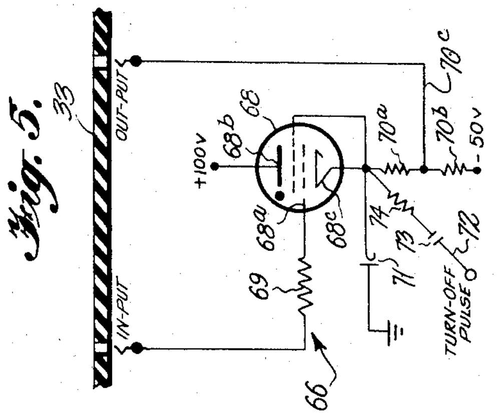
Figure 5 is a schematic diagram of one of the thyratron "primer" circuits employed in the Temporary Memory unit of the present invention.

The preferred form of the priming thyratron stages 66 is illustrated in schematic form in Figure 5, wherein the thyratron tube is designated by reference character 68. The control grid **68*a* of the thyratron 68 is intercoupled with a socket of the plug board 33 through a resistor 69, the plate 68*b* is coupled directly to a positive 100 volt supply, and the cathode 68*c* is coupled to a negative 50 volt supply through resistors 70*a* and 70*b*, a lead 70*c* being tapped off at a point between the cathode resistors 70*a* and 70*b* and extending to a socket of the plug board 33 to present the thyratron output at this socket. Additionally, a diode 71 is coupled between the cathode 68*c* above the resistor 70*a* and ground with the cathode of the diode connected to the cathode 68*c* to insure that the thyratron cathode 68*c* does not go below ground potential. A turn-off pulse input lead 72 is also coupled to the same point on the cathode 68*c*, the lead 72 having a capacitor 73 and resistor 74 in series. The pulses to be supplied through the lead 72 to turn off the priming stages are preferably the "end-of-frame" pulses $T_F$ occurring at the end of each complete scanning raster or the "end-of-character" pulses $T_C$ and are of such magnitude and polarity as to elevate the cathode 68*c* to cut-off condition and terminate conduction through the thyratron 68**. The turn off pulses may be derived from a number of sources in the system, but in a preferred embodiment, the "end-of-frame" turn off pulse, $T_F$, is produced by a thyratron triggered by the pulse which returns the scanning beam to start scanning a new raster, and the "end-of-character" turn off pulse, $T_C$, is produced by the source indicated in Fig. 8 actuated in a manner to be later described.

Figures 6, 9:
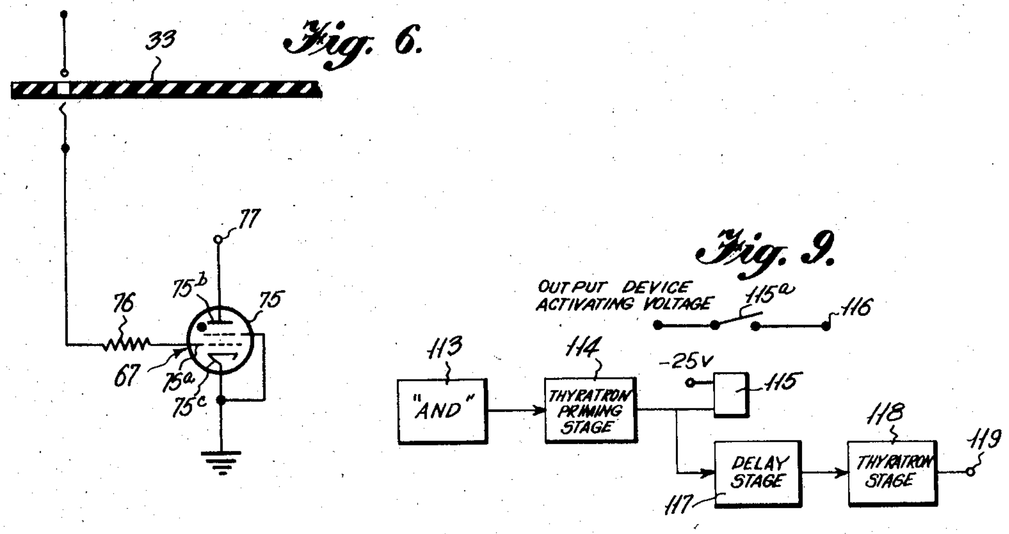
Figure 6 is a schematic diagram of one of the thyratron "shape memory" circuits employed in the Temporary Memory unit.
Figure 9 is a block diagram of a circuit that may be employed to produce "end-of-character" pulses.

The preferred form of the shape memory stages 67 is as illustrated in Figure 6. The control grid **75*a* of the thyratron 75 is brought to a socket of the plug board 33 through a resistor 76, the cathode 75*c* is coupled directly to ground, and the plate 75*b* is coupled directly to a terminal 77 which in turn is coupled to one terminal of one of the relays 86–93 having another terminal connected to a positive 100 volt source through normally closed contacts of an "end-of-character" reset relay 95**.

In the programming of the system, as will later appear, the thyratron priming stages 66 and other appropriate plug board voltage sources will be intercoupled with the shape memory stages 67 through comparator circuits 56 in the same manner used for firing the priming stages themselves, firing a shape memory tube when the appropriate conditions are present. In this manner, for example, a pair of thyratrons may be made sensitive to the sequence of detection of events by the comparator circuits 56, and the shape memory stage, by firing, will record the fact that the proper sequence has occurred.

Figure 7:
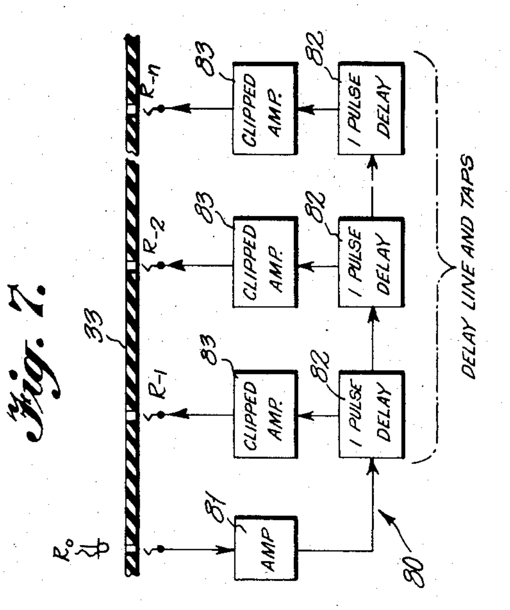
Figure 7 is a block diagram of the pulse shift register in the Temporary Memory unit.

An additional component of the temporary memory unit 65 is the pulse shift register 80, illustrated in Figure 7. This unit constitutes a source of recognition pulses delayed by intervals equal to the time spacing of successive spots of the scanning raster, or multiples thereof, to be presented to comparator circuits 56 with selected later recognition pulses to determine coincidence of certain conditions. The pulse shift register 80 as shown in Figure 7, employs an amplifier 81 as the input stage, the input of the amplifier 81 being coupled to a socket of the plug board 33. Associated with the emplifier 81 are a plurality of identical "one-pulse" delay stages 82, equal to the number of delay intervals desired for the program of the system, which stages may be formed of a delay line, sequenced trigger circuits, or like known fixed delay means. These delay stages 82 are arranged in succession with their inputs coupled to the preceding stage. One output is coupled to the succeeding stage, and another output is coupled through clipped amplifiers 83 for limiting the magnitude of the output pulses to a standard value, preferably ±25 volts, and is applied to separate sockets of the plug board 33. These delayed output pulses are designated $R_{-i}$, where "*i*" is the number of delay intervals.

Figure 8:
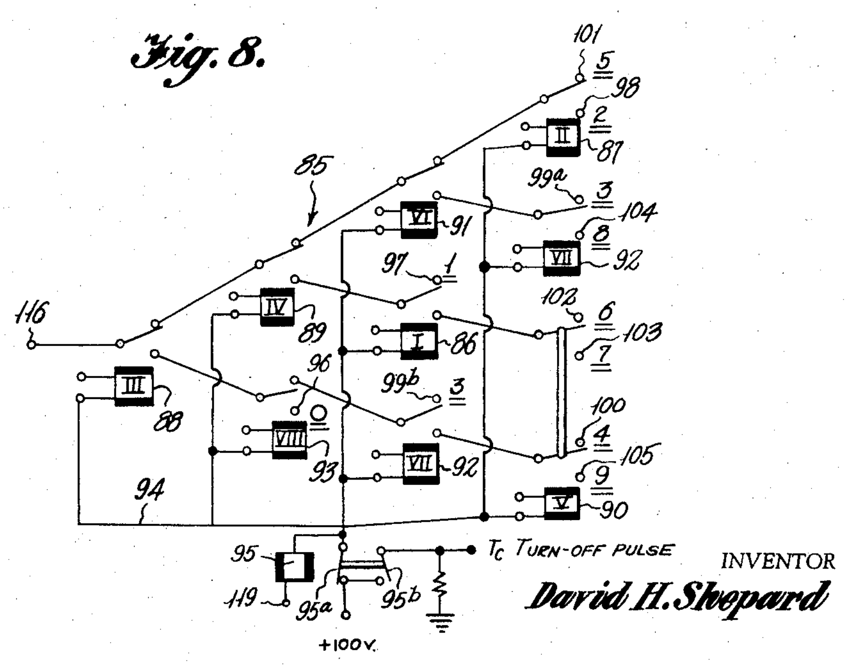
Figure 8 is a schematic illustration of output storage unit showing the routing of the thyratron-controlled relays to produce an output signal appropriate to the numerical character recognized.

The output leads 77 from the plates of each of the shape memory stages 67 extend to separate relay coils of a bank of relays constituting an output storage unit 85, illustrated schematically in Figure 8. This output storage unit 85 is similar to the routing relay network making up the interpreter circuit 50 of my co-pending application S.N. 213,338, now Patent No. 2,663,758, issued December 22, 1953, and illustrated in Figure 8 of that application. Specifically, the output storage unit 85 in the preferred embodiment herein described consists of eight routing relay coils 86–93, bearing Roman numerals I–VIII respectively. The routing relay coils 86–93 are associated with relay contact arms **86*a*–93*a* respectively, to be operated in various combinations in accordance with firing of shape memory stages 67 to establish a current routing to a particular output terminal to be connected to appropriate input terminals of an output device such as particular keys of a solenoid operated electric typewriter. The lower terminal of each of these relay coils 86–93 are connected through a common lead 94 and the normally closed contact arm 95*a* of an "end-of-character" reset relay 95 to the positive terminal of a relay power supply. The other terminal of the coil of relay 95** is supplied with a delayed "end-of-character" pulse from a source to be later described.

The upper terminals of the relay coils 86–93 are coupled to the output leads 77 of selected shape memory stages 67. With this arrangement, firing of the thyratron of a particular shape memory stage 67 while the character is being scanned will energize the relay coil of the group 86–93 coupled thereto shifting its contact arm to close the output device actuating voltage routing circuit through that relay. No voltage is applied to the routing circuit through the contact of these relays however until an end-of-character pulse is produced signifying detection of the end of the character being scanned, as will be later described.

Figure 10:
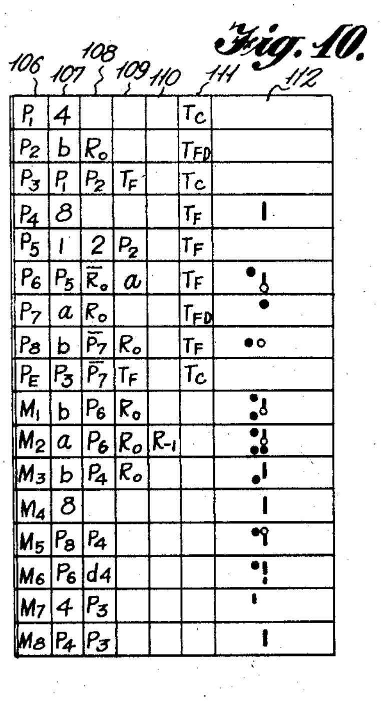
Figure 10 is a program chart showing the circuit connections to be established in the Permanent Memory plugboard of the present invention to program the apparatus to recognize numerals from zero to nine.

The combinations of the relay coils 86–93 to be energized to establish the routing for presenting signals at terminals 96–105 for the numerals 0–9 respectively in the program illustrated in Figure 10 is as follows:

0—coils 88 and 93 energized
1—coil 89 energized, but 86 and 88 not energized
2—coil 87 energized, but 88, 89 and 91 not energized
3—88 energized, and 93 and 92 not energized or 91 energized and 88, 89 and 92 not energized
4—coils 88 and 92 energized, but 90 and 93 not energized
5—no coils energized
6—coils 89 and 86 energized, but 88 and 90 not energized
7—coils 89, 86 and 90 energized, but 88 not energized
8—coils 91 and 92 energized, but 88 and 89 not energized
9—coils 88, 92 and 90 energized, but 93 not energized The output terminals 96–105 provide separate output signals identifying the character read by the terminal on which the signals occur. These output terminals may be coupled to any desired output device, but in the preferred embodiment herein described are connected to the key-actuating solenoids of an electric typewriter to actuate the keys in accordance with the character identified and reproduce the same.

In the program chart of Figure 10, the reference characters $P_1$ to $P_8$ refer to thyratron priming stages of the type illustrated in Figure 5 of the drawing having an "and" circuit 56 coupled to the input thereof; the symbol $P_E$ designates a thyratron priming stage described in greater detail in connection with the circuit illustrated in Figure 9 for producing the "end-of-character" reset pulse; the symbols $M_1$ to $M_8$ designate shape memory stages of the type illustrated in Figure 6; the symbols *"a"* and *"b"* designate counter pulses produced by the clock pulse counter in synchronism with the spots of the series 1*a* to 16*a* and 1*b* to 16*b*, respectively, of the scanning raster; the symbol *"d*()*"* indicates the derivative of an output pulse; the numerals designate the outputs of the corresponding binary counter stages of the recognition pulse counter 40; the symbol $T_C$ designates the "end-of-character" pulse; the symbol $T_F$ designates the "end-of-frame" pulse produced in synchronism with every 32nd pulse produced by the clock pulse counter 34; the symbol $T_{FD}$ indicates a slightly delayed end-of-frame pulse; and the symbols $R_0$ and $\overline{R_0}$ designate the recognition and non-recognition pulses. In that chart, the first column 106 contains the symbols indicating the priming and shape memory stages, the next four columns 107 to 110 indicate the various input conditions necessary to fire those stages, the column 111 indicates reset or turn off pulses applied to that stage, and the column 112 contains an illustration of the shapes effecting firing of the stages.

The "end-of-character" reset pulse, hereinbefore referred to, is produced in the following manner, reference being had particularly to Figure 9 and the program chart illustrated in Figure 10. The immediate components of the circuit producing the "end-of-character" pulses comprise an "and" circuit 113 identical with the "and" circuit 56 illustrated in Figure 4, the output of which is coupled to the input of a thyratron priming stage 114, designated $P_E$ in Figure 10. The output of the thyratron priming stage 114 is coupled through a relay coil 115 to a −25 volt supply. A source of the output device actuating voltage is coupled through the normally open contacts 115*a* of the relay coil 115 to the input terminal 116 (see Fig. 8) of the output storage unit 85 providing the source of the output voltage to the output terminals 96–105 for actuating the output device.

The output of the thyratron priming stage 114 is also coupled through a delay stage 117, which may be a single shot multivibrator designed to delay the output of the priming stage 114 coupled therethrough for a period of time equal to that required to energize the output device. This delayed voltage is coupled from the delay stage 117 to energize a thyratron 118, the plate of which is coupled directly through the coil of relay 95. The terminal of the "turn off pulse" lead 72 of each of the thyratron priming stages 66 to be turned off by the $T_C$ pulse is coupled through the normally open second relay contact 95*b* of the relay 95 to a +100-volt supply. Each of the priming stages 66 which are in a state of conduction will then be cut off by the positive surge produced by the relay contact 95*b* upon the delayed conduction of the thyratron 118 and consequently energization of the relay 95, the relay cutting itself off when it withdraws its contact 95*a*.

Reference to the program of Figure 10 will indicate that the inputs coupled to the thyratron priming stage $P_E$ and its "and" circuit, identified as 114 and 113, respectively, in Figure 9, are the output of the priming stage $P_3$, the "end-of-frame" pulse, and the inverse of the output of priming stage $P_7$. Conduction in the priming stage $P_3$, in turn, is effected only when the priming stages $P_1$ and $P_2$ are in a conducting state. The reason for depending triggering of the priming stage $P_E$ on these various factors is as follows. It will be noted that the number 4 appears opposite the symbol $P_1$ in Figure 10. This means that in the program there indicated, the priming tube $P_1$ will only be fired when the recognition pulse counter 40 has reached the count of 4, that is, that four successive spots of the series of spots 1*a* to 16*a* of the scanning raster have produced hits. This is accomplished by applying the pulse produced at the plate of the appropriate stage of the recognition pulse counter 40 which is indicative of a count of 4 successive hits on the *"a"* side of the scanning raster to the input of the comparator circuit 56 coupled to the priming stage $P_1$ to fire that priming stage. The purpose of the stage $P_1$ is to eliminate consideration of stray specks on the paper as a character to be read, by requiring that any dark item must have at least one short vertical line segment to be considered a character.

The purpose of the second priming stage $P_2$ is to insure that a dark area is also seen in coincidence with one of the second series of spots 1*b* to 16*b* before the dark area will be considered a character. To this end, each recognition pulse $R_0$ at the output of the gating circuit 38 is coupled to one socket of the "and" circuit 56 coupled to the input of primer $P_2$ and each clock pulse coincident with the modulating pulses on the cathode ray tube grid 28 producing the spots 1*b* to 16*b* is coupled to another socket of that "and" circuit. Simultaneous arrival of a recognition pulse and a pulse signifying a spot of the series 1*b* to 16*b* will therefore trigger the primer stage $P_2$ indicating occurrence of a dark area on the side *"b"* of the scanning raster.

The priming stage $P_3$, as indicated in the program, only fires when both the priming stages $P_1$ and $P_2$ have fired and the "end-of-frame" pulse $T_F$ reaches the input "and" circuit of the priming stage $P_3$. When priming stage $P_3$ fires, it is generally safe to assume that the character to be read has now entered slits *"a"* and *"b"* of the scanning raster formed by spots 1*a* to 16*a* and 1*b* to 16*b*, respectively.

The input "and" circuit of the priming stage $P_7$ is coupled to clock pulses coincident with the cathode ray tube modulating pulses producing spots 1*a* to 16*a* and to the output of the gating circuit 38, so that the priming stage $P_7$ is fired only when recognition pulses are received for at least one of the group of spots 1*a* to 16*a*. This stage $P_7$ is reset at the end of each complete cycle by a delayed "end-of-frame" pulse $T_{FD}$. The output lead $70_C$ of the priming stage $P_7$, which has a voltage of minus 25 volts when the thyratron has not been fired and plus 25 volts when it has been fired, is coupled through a conventional inverter stage which produces a corresponding voltage of opposite polarity relative to that on the lead $70_C$, and this inverted output, designated $\overline{P_7}$, is coupled to one of the input leads of the "and" circuit for the priming stage $P_E$. Thus a positive voltage is applied to the input circuit of $P_E$ from $P_7$ upon arrival of an "end-of-frame" pulse $T_F$ at the end of scanning of a complete frame only when $P_7$ has not fired for one complete series of spots 1*a* to 16*a*.

From the above it will be apparent that the priming stage $P_E$ will be fired to initiate the end-of-character sequence when the priming stage $P_3$ has been fired, indicating that no recognition pulse was produced for the spots 1*a* to 16*a* during one complete frame.

To facilitate a complete understanding of the operation of this system to detect and recognize numerals, the operation of the decision unit and temporary memory in detecting three of the shapes used in actually distinguishing numerals will be described. All of the shapes used to detect and distinguish numerals in the program indicated in Figure 10 and the conditions necessary to fire the priming and shape memory stages to detect these shapes is indicated fully in the program chart.

The simplest shape used in this program is that appearing in connection with the shape memory stage $M_4$. The number 8 is the only symbol following the symbol $M_4$, indicating that the only condition necessary to fire the shape memory stage $M_4$ is that the fourth stage of the recognition pulse counter 40 has changed to the positive state signifying that the counter has reached a count of eight. The effect of this is to fire the memory stage $M_4$ whenever recognition pulses $R_0$ are produced for a succession of eight of the spots 1*a* to 16*a* of the scanning raster. Since the height of the characters in this program is assumed to be equal to approximately 10 to 12 horizontal scanning lines, the tube $M_4$ will fire only for those characters having a reasonably long vertical line segment. The characters 1, 6 and 7, for example, in the font of type illustrated in Figure 12, have this characteristic, while a vertical line segment of such length does not occur in the numbers 2, 3, 5 and 8 in this font of type. Firing of the memory stage $M_4$, which is intercoupled with the relay coil 89, (IV), will energize the relay coil 89 to attract its contact and route the output of relay 115 energized by the "end-of-character" priming tube $P_E$ on the terminal 116 to the leads of output terminals 97, 102 or 103 which are coupled to the solenoids of the output device actuating the type for the numbers 1, 6 and 7.

A more complicated shape is that described for the memory stage $M_1$. The purpose of this stage is to distinguish between the numeral 1, which does not contain the shape detected by this stage, and the numerals 6 and 7 which do contain this shape. The shape detected by the memory stage $M_1$ is indicated by reference character 120 in Figure 12 and is superimposed over the numerals 1, 6 and 7 in that figure.

A schematic diagram of the priming stage $P_6$ and the shape memory stage $M_1$ interconnected in a manner to detect this shape is illustrated in Figure 11.

Referring to the program chart of Figure 10, the input voltages applied to the "and" circuit for the memory stage $M_1$, as indicated in columns 107, 108 and 109, are designated by the symbols "*b*," $P_6$ and $R_0$. The symbol "*b*" refers to input pulses synchronous with the spots 1*b* to 16*b* on the left side of the scanning raster, and the symbol $R_0$ designates the recognition pulses obtained from the output of the gating circuit 38. Simultaneous occurrence of the voltages "*b*" and $R_0$ indicates that recognition has occurred in the series of spots on the left side of the scanning raster after some other event or condition is present as signified by the symbol $P_6$. The condition $P_6$, which is physically represented by firing of the priming stage $P_6$, in turn is a combination of other events, as indicated by the symbols in the columns 107—110 beside the symbol $P_6$, namely, $P_5$, $\bar{R}_0$ and "*a*."

Since the symbol $P_5$ occurs beside the symbol $P_6$ in the column 106, it is necessary to refer back to the program conditions for $P_5$ to understand those for $P_6$. Firing of the priming stage $P_5$ is also the product of a combination of events indicated in columns 107—110 as 1, 2 and $P_2$. This requires further references back to the program conditions for $P_2$. The symbol $P_2$ indicates firing of the thyratron priming stage $P_2$ on simultaneous occurrence of a recognition pulse $R_0$ synchronized with one of the spots 1*b* to 16*b*, as has already been described in connection with the "end-of-character" sequence. The symbol $P_2$, translated into simple terms, means recognition in the slit "*b*" of the scanning raster.

The symbols 1, 2 and $P_2$ beside the symbol $P_5$ in column 106 indicate that the thyratron $P_5$ will be fired upon occurrence of pulses from the recognition pulse counter 40 totalling a count of 3 successive recognition pulses on the "*a*" side of the scanning raster, together with firing of thyratron $P_2$ which requires a recognition pulse $R_0$ for a spot on the "*b*" side. Since the priming thyratron $P_2$ must be conducting when the count of 3 recognition pulses is completed for the thyratron $P_5$ to be fired, the thyratron $P_2$ must have been fired before the end of the 3-count vertical line segment. The $P_5$ following the symbol $P_6$ indicates therefore that the shape memory stage $P_6$ has been fired by the occurrence of a vertical line segment on the "*a*" side of the scanning raster which is at least 3 counts long and a spot on the "*b*" side above the bottom of the line segment.

The other symbols, appearing besides $P_6$ are $\overline{R_0}$ and "*a*." $\overline{R_0}$, as previously described, symbolizes a nonrecognition pulse which is produced at the output of the inverter 39, and "*a*" indicates pulses synchronized with the spots 1*a* to 16*a* of the scanning raster. The effect of this pair of conditions $\overline{R_0}$ and "*a*" is to require that the vertical line segment of the character occurring in slit "*a*" of the scanning raster must come to an end before the priming tube $P_6$ will fire.

The relative positions of the components of the shape effecting firing of the memory stage $M_1$ is pictured at 120 in Figure 12. The three dark spots 121, 122 and 123 at the right hand side of the group 120 illustrate the occurrence of a vertical line segment at least three counts long required to fire the priming stage $P_5$. The open spot 124 below the three dark spots 121 to 123 symbolizes the occurrence of a nonrecognition pulse $\overline{R_0}$ in the "*a*" side of the scanning raster following the vertical line segment, this condition being detected by simultaneous occurrence of an "*a*" pulse and a nonrecognition pulse $\overline{R_0}$.

The firing of the priming stage $P_2$ is a condition precedent to firing of the stage $P_5$, so that the occurrence of a recognition pulse for a spot on the "*b*" side of the scanning raster must occur above the bottom of the vertical line segment indicated by the nonrecognition pulse symbol. This is indicated in Figure 12 by the dark spot 125, which must occur at the "*b*" side of the scanning raster prior to the end of the vertical line segment on the "*a*" side of the scanning raster. As is indicated in Figure 11, a "*b*" pulse and a recognition pulse $R_0$ are coupled to the input "and" circuit 56 of the memory stage $M_1$ along with the output of the priming stage $P_6$ derived from the output leads $70_C$. This introduces the condition that recognition must occur in the "*b*" side of the scanning raster after the occurrence of the end of the vertical line segment indicated by spots 121—123, this last condition being indicated by the dark spot 126.

When this recognition shape 120 is superimposed over the number 1 in the font of type illustrated in Figure 12, the priming tube $P_5$ will not fire since no recognition will occur on the "*b*" side of the scanning raster for the spots 125 and 126. Recognition for all spots will occur, however, for the numerals 6 and 7, as illustrated in Figure 12, thus effecting firing of the memory stage $M_1$. The relay 86, bearing the Roman numeral I, is connected to the terminal 77 of the memory stage $M_1$, so that this relay is energized by firing of the memory stage $M_1$, attracting the contact arm of relay 86 away from the terminal 97. This completes the routing circuit through the contact arm of relay 89 to the upper contact arm of relay 90 associated with terminals 102 and 103 associated with the numerals 6 and 7 when the output device actuating voltage is applied to the terminal 116 upon firing of the stage 114 during the "end-of-character" reference.

In a similar manner, firing of the shape memory tube $M_2$ is effected by firing of the priming stage $P_6$, the reception of a recognition pulse from the *"a"* side of the scanning raster below the end of the vertical line segment, indicated by the symbols *a* and $R_0$, and the reception of a recognition pulse from the *"b"* side of the scanning raster which occurred one pulse interval immediately preceding the occurrence of the lower spot on the *"a"* side. This latter pulse is designated $R_{-1}$ and is obtained from the output of the clipped amplifier 83 of the pulse shift register 80. This produces recognition of the shape illustrated in column 112 beside the symbol $M_2$.

The other shapes illustrated in column 112 of the program chart of Figure 10 produce firing of the corresponding priming and shape memory stages by simultaneous voltages produced from the sources indicated in columns 107 to 110.

The program illustrated in Figure 10 and described above applies to one of the conventional fonts of type, sample letters of which are illustrated in Figure 12. More complicated programs can and have been devised which are applicable simultaneously to several fonts of type. This is accomplished by programming the unit to interpret characters to be read on the basis of common distinctive characteristics of each character of the several different fonts of type. Where characters are fundamentally different in two type fonts, such as an open or a closed digit "4," more than one exit from the relay network (or equivalent) are often commoned to the same output terminal representing the given character. Experience has shown that one program handling several different styles and sizes of type simultaneously may require only a slight increase in equipment relative to that required for a single type font. Even hand printed characters made with reasonable care but without mechanical aids have been successfully identified by such programs without further refinements.

It will be observed that by reason of the programming of the above described system, instead of detecting particular shapes at fixed positions on the raster, misalignment of characters to be read relative to the raster will not disturb the operation of the device providing only that the scanning area is adequate in size. The various shapes and patterns to be detected are determined by counts or "measurements" from the first portions of these shapes encountered, thus effecting detection if the pattern is present irrespective of where it is located vertically on the scanning raster. To correct for greater misalignment, gating circuits for changing the direct current on the vertical deflection plates of the cathode ray tube may be provided which are activated on detection of various strokes approaching or reaching the very extreme limits of the scanning raster.

It may be seen that it is possible to recognize more complicated shapes than that described above for $M_2$ solely through the use of the shift register by plugging the appropriate stages of the shift register into the input "and" circuit of a shape memory tube. In fact, it is possible to recognize whole characters by this means alone. Such a system would, obviously, require a pulse shift register or the logical equivalent delay line of sufficient length to correspond in time substantially to the period of scanning of the whole character to which the recognition and non-recognition signals are fed with the appropriate stages of the shift register or delay line tapped to make available at each of the delay stages the recognition and non-recognition signals delayed by the successive delay stages thereof. The recognition and non-recognition signals, occurring at any selected combinations of delay stages, may be fed to input "And" circuits of shape memory tubes or the like for simultaneous comparison or detection of patterns of recognition and/or non-recognition signals sensed at various points during the scanning of the whole character to provide a basis for character recognition. However a program utilizing two "slits" such as described above is often not the most appropriate for such a case. This type of program retains the feature of permitting recognition without regard to alignment as long as the character does not extend beyond the scanning limits. However, this type of program does not readily permit variations such as described above and therefore is primarily useful only where a single style and size of type is to be recognized.

While but one preferred embodiment of the invention has been specifically shown and described, various modifications may be made therein without departing from the spirit and scope of the invention, and it is desired, therefore, that only such limitations shall be placed on the invention as are imposed by the prior art and are set forth in the appended claims.

What I claim is:

1. Apparatus for reading intelligence-bearing items comprising means for scanning the area of an item to be read in successive lines of scanning, means for sensing intercepts of any portions of the item with the incremental zones comprising each scanning line and producing recognition and nonrecognition signals, respectively, upon occurrence or absence of said intercepts, a plurality of time delay stages for delaying said recognition and nonrecognition signals for successive time intervals, means responive to designated patterns of recognition and nonrecognition signals occurring in preselected intrapattern time relation at selected delay stages wherever the patterns may occur along the scanning lines for recognizing shapes to be identified corresponding to said patterns, and means to provide an output signal indicative of the shape recognized.

2. Apparatus for reading intelligence-bearing items comprising means for scanning an item to be read along a plurality of scanning lines, means sensing the item at a plurality of uniformly spaced sampling spots on each scanning line, said sampling spots occurring at a constant repetition rate and being arranged in two vertical columns located respectively to the left and to the right of the center of the scanning field, means responsive to the presence and absence of a portion of the item to be read occurring at said sampling spots for producing recognition and nonrecognition signals in accordance with the conditions sensed, analyzing means for analyzing the recognition and nonrecognition signals having means for detecting preselected signal conditions including preselected patterns of recognition and nonrecognition signals for successive sampling spots on single scanning lines, preselected pattern of recognition and nonrecognition signals for vertically aligned sampling spots, and preselected patterns of recognition and non-recognition signals for selectively related sampling spots in a plurality of said scanning lines, storage means for recording for the duration of the scanning of the item being read the detection of said preselected signal conditions, means for detecting the end of a character being scanned, and signal generating means conditioned by said storage means during scanning of the item in response to the accumulated recorded conditions therein to provide an output device actuating signal indicative of the item read, following detection of the end of the item.

3. Apparatus for reading intelligence-bearing items during continuous movement thereof comprising means for scanning an item to be read along a plurality of scanning lines extending substantially parallel to the direction of travel of the items, means sensing the item at a plurality of spaced sampling spots on each scanning line, said spots being located uniformly along said scanning lines to form vertical columns of sampling spots perpendicular to the direction of travel of said items, means responsive to the presence and absence of a portion of the item to be read occurring at said sampling sports for producing recognition and nonrecognition signals in accordance with the conditions sensed, counting means for producing signals on recurrence of successive recognition and nonrecognition signals in selected vertical columns of said sampling spots, means for delaying said recognition and nonrecognition signals for integral multiples of the period of said sampling spots, storage means for recording occurrence of selected signal conditions for the duration of the scanning of the item being read, analyzing means responsive to simultaneous occurrence of selected recognition and nonrecognition signals, delayed recognition and nonrecognition signals, counting means signals to energize said storage means upon occurrence of selected sequences and recurrences of said recognition and nonrecognition signals, and signal generating means conditioned by said storage means during scanning of the item in response to the accumulated recorded conditions therein to provide an output device actuating signal indicative of the item read.

4. Apparatus for reading intelligence-bearing items during continuous movement thereof comprising means for scanning a plurality of times the area of each item to be read in scanning lines extending substantially parallel to the direction of travel of the items and progressing downward perpendicularly to the direction of travel of the items, means for sensing the occurrence and absence of portions of the item intercepting any one of at least a pair of spaced sampling spots located uniformly along each scanning line, the sampling spots of the plurality of scanning lines being located in two vertical columns symmetrically spaced at opposite sides of the center of the scanning field, means for producing recognition and nonrecognition signals in accordance with the conditions sensed by the sensing means at the sampling spots, analyzing means including a plurality of comparator circuits and counter circuits for sensing the occurrence of preselected sequences and recurrences of said recognition and nonrecognition signals, storage means for recording for the duration of one scanning cycle the sensing of certain sequences and recurrences of recognition and nonrecognition signals by said analyzing means, other storage means for recording for the duration of the scanning of an item being read certain recordings by the first mentioned storage means together with sensing of selected sequences and recurrences of said recognition and nonrecognition signals by said analyzing means, and signal generating means producing an output device actuating signal immediately following complete scanning of an item and conditioned by said storage means in response to the accumulated recorded conditions therein to provide an output signal indicative of the item read.

5. Apparatus for reading intelligence-bearing characters comprising scanning means for progressively scanning a scanning field and producing scan signals characteristic of characters scanned therein, and interpreter means responsive to selected intracharacter relationships of portions of the characteristic scan signals of a character including means to render the interpreter means free of dependence upon any selected reference relationship of the characters with the scanning field whereby the interpreter means can identify the selected intracharacter relationships regardless of where the character may occur in the scanning field for producing output signals indicative of the character scanned.

6. Apparatus for reading intelligence-bearing characters comprising scanning means for progressively scanning a scanning field, detector means for generating a scan signal for each character scanned in said field having a wave shape characteristic of the character scanned, scan signal interpreter means responsive to selected patterns of wave shape portions identifying the characters scanned in said scan signals for interpreting the patterns and recognizing the characters therefrom including means for producing a datum signal in response to selected character detection events providing a reference datum for locating selected patterns in said wave shape relative to the character scanned and means for detecting selected patterns in said wave shape in preselected reference relationship with the scharacter scanned responsive to the time relationship between portions of the patterns and said datum signal to detect selected intracharacter relationships denoted by said patterns regardless of where the characters occur in the scanning field to sense the identity of the character therefrom and produce output signals indicative of the character scanned.

7. The combination recited in claim 5, including means to sample different portions of the scan signal for each character, and means to convert the samples from each scan signal derived from a character to a code number representative of said character.

8. The combination recited in claim 5 wherein said interpreter means includes a plurality of delay means responsive to scan signals applied thereto for producing delayed output signals substantially identical to said scan signal but delayed by preselected time intervals, and means for sensing signals applied to said delay means at a plurality of sampling points separated by preselected time delay intervals for simultaneously sensing a plurality of portions of said scan signal generated at different times during scanning of a character.

9. Apparatus for reading intelligence-bearing characters comprising scanning means for scanning the characters successively along a plurality of rectilinear scan lines, detector means for sensing interception of the scan line by the character during a line scan and producing intercept and non-intercept scan signals respectively denoting interception and non-interception of the scan line by a portion of the character, scan signal analyzer means responsive to patterns of said intercept and non-intercept scan signals having preselected intra-character relationships for recognizing the patterns including means to render the interpreter means free of dependence upon the location of the character along the axis of the scan line comprising means for sensing the time relationship within the scan line of the scan signals relative to a selected intercept scan signal of that scan line and detecting therefrom patterns of intercept and non-intercept scan signals denoting characteristics which differentiate between characters whereby the interpreter means can identify the patterns independent of the location of the character along the axis of the scan line, and output signal generating means responsive to preselected combinations of patterns detected by said analyzer means for producing output signals indicative of the character scanned.

10. Apparatus for reading intelligence-bearing characters comprising scanning means for scanning the characters successively along a plurality of rectilinear scan lines, detector means for sensing interception of each scan line by the character during the line scan and producing intercept and non-intercept scan signals respectively denoting interception and non-interception of the scan line by a portion of the character, scan signal analyzer means responsive to patterns of said intercept and non-intercept scan signals having preselected intra-character relationships for identifying combinations of selected identification factors of the characters including means for producing a datum signal in response to a selected scan signal pattern providing a reference datum for locating the patterns of intercept and non-intercept scan signals produced in said line scan relative to the character scanned and means for detecting selected patterns of said intercept and non-intercept scan signals in preselected reference relationship with the character scanned responsive to the time relationship between the intercept and non-intercept signals comprising the patterns and said datum signal to detect character identification factors denoted by the reference patterns and generate a signal indicative of the factor detected, and output signal generating means responsive to preselected combinations of identification factors detected during the scanning of a whole character for producing output signals indicative of the character scanned.

11. Apparatus for reading intelligence-bearing characters comprising scanning means for scanning each character in a plurality of successive scanning frames progressing laterally across the character, each scanning frame comprising a plurality of laterally spaced rectilinear scan lines extending vertically of the character in parallelism with each other and having a length greater than the height of the characters, detector means for sensing interception of each of the scan lines comprising a scanning frame by the character during a frame scan and producing intercept and non-intercept scan signals respectively denoting interception and non-interception of the scan line by a portion of the character, scan signal analyzer means responsive to patterns of said intercept and non-intercept scan signals having preselected intracharacter relationships for recognizing the patterns including means for sensing the time relationship within the scanning frame of the scan signals relative to a selected intercept scan signal in that scanning frame and detecting therefrom patterns of intercept and non-intercept scan signals denoting characteristics which differentiate between characters independent of the location of the characters along the scan lines, and output signal generating means responsive to preselected combinations of patterns detected by said analyzer means for producing output signals indicative of the character scanned.

12. Apparatus for reading intelligence-bearing characters comprising a scanning station, means for establishing a scanning frame for inspection of characters progressing laterally through said station wherein a plurality of such scanning frames successively traverse the characters, said scanning frame comprising at least a pair of rectilinear scan lines spaced apart a fraction of a character space and extending vertically of the character and traversing a length greater than the height of the character, detector means for sensing interception of the scan lines by the character during a scanning frame and producing intercept and non-intercept scan signals respectively denoting interception and non-interception of the scan line by a portion of the character, interpreter means responsive to selected patterns of said intercept and non-intercept scan signals denoting preselected intracharacter identification factors including means to render the interpreter means free of dependence upon the location of the character along the axis of the scan lines for detecting from said patterns identification factors which differentiate between characters whereby the interpreter means can identify said identification factors independent of any preselected registry relationship of the characters with the scanning frame and means responsive to preselected combinations of the identification factors detected for producing output signals indicative of the character scanned.

13. Apparatus for reading intelligence-bearing characters comprising scanning means for scanning a character bearing area in rectilinear scanning lines defining a scanning field and producing scan signals indicative of interception and non-interception of said scanning lines with a character scanned, and scan signal interpreter means responsive to selected patterns of intercept and non-intercept denoting scan signals signifying preselected intracharacter relationships wherever said patterns may occur in the scanning field for detecting characteristics which differentiate between characters and producing signals responsive to preselected combinations of differentiating characteristics detected indicative of the character scanned, said interpreter means including a plurality of delay means responsive to input signals applied thereto for producing delayed output signals substantially identical to said input signals but delayed by a preselected time interval, a plurality of settable means disposed to assume a set condition in response to set signals applied thereto and to resume a reset condition in response to reset signals applied thereto and producing condition-indicating output signals, a plurality of coincidence detecting means responsive to at least two input signals applied thereto for producing output signals only during time coincidence of said input signals, a plurality of measuring means responsive to the extent of an input signal sequence applied thereto for producing an output signal indicative of the extent measured, and a plurality of connecting means for connecting said scanning means, said delay means, said settable means, said coincidence detecting means and said measuring means, by conductively bridging selected pairs of output and input terminals thereof in a plurality of combinations appropriate to effect a selected program for said interpreter means.

14. Apparatus for reading intelligence-bearing characters comprising scanning means for scanning a character bearing area in rectilinear scanning lines defining a scanning field and producing scan signals indicative of interception and non-interception of said scanning lines with a character scanned, and scan signal interpreter means responsive to selected patterns of intercept and non-intercept denoting scan signals signifying preselected intracharacter relationships wherever said patterns may occur in the scanning field for detecting characteristics which differentiate between characters and producing signals responsive to preselected combinations of differentiating characteristics detected indicative of the character scanned, said interpreter means including a plurality of settable means disposed to assume a set condition in response to set signals applied thereto and to resume a reset condition in response to reset signals applied thereto and producing condition-indicating output signals, a plurality of coincidence detecting means responsive to at least two input signals applied thereto for producing output signals only during time coincidence of said input signals, a plurality of measuring means responsive to the extent of an input signal sequence applied thereto for producing an output signal indicative of the extent measured, and a plurality of connecting means for connecting said scanning means, said settable means, said coincidence detecting means and said measuring means, by conductively bridging selected pairs of output and input terminals thereof in a plurality of combinations appropriate to effect a selected program for said interpreter means.

15. Apparatus for reading intelligence-bearing characters on a character-bearing surface during continuous movement of the characters comprising means for progressively optically superimposing over new areas of a character to be read a scanning raster including means for sweeping a beam of energy in successive scanning lines substantially paralleling the axis of movement of the characters and progressing perpendicularly to said axis of movement and means for electronically gating said beam of energy to produce uniformly located spaced spots of light along each scanning line in a manner providing a plurality of parallel columns of light spots arranged perpendicular to said axis of character movement wherein said columns of light spots are spaced from each other to span a fraction of a character area, means including an element responsive to reflected light originating in said spots and reflected from said surface for detecting changes in the amount of energy reflected from said surface and producing intercept and non-intercept scan signals respectively denoting presence and absence of portions of a character intercepting said spots of light in each column of spots, interpreter means responsive to patterns of said intercept and non-intercept scan signals signifying selected intracharacter identification factors including means to render the interpreter means free of dependence upon the location of the character along the axis of the scanning lines whereby the interpreter means can identify said patterns regardless of where the patterns may occur along said columns of spots of light for detecting identification factors denoted by said patterns which differentiate between characters and producing interpreter signals indicative of the identification factors detected, and means responsive to preselected combinations of the identification factors detected for producing output signals indicative of the character scanned.

16. Automatic character sensing apparatus comprising a scanning station, means for progressing characters laterally through said scanning station along a preselected axis of character progression, means for scanning each character progressively along a plurality of successive rectilinear scanning lines extending perpendicular to the axis of character progression having a length greater than the height of the characters and progressing laterally in parallelism with each other over the character area, means for sensing interception of the scanning lines by the character during a line scan and producing intercept and non-intercept scan signals respectively denoting interception and non-interception of the scan line by a portion of the character, scan signal analyzer means responsive to selected patterns of said intercept and non-intercept scan signals including means to render the interpreter means free of dependence upon the location of the character along the axis of the scanning lines whereby the interpreter means can identify said patterns regardless of where the patterns may occur along the scan lines for detecting from intracharacter relationships of the pattern portions selected factors of length, continuity, shape, and relative location of various portions of the character scanned, storage means for recording for selected periods during the scanning cycle of a whole character the factors detected by said analyzer means, and output signal generating means responsive to preselected combinations of factors detected by said analyzer means denoted by the accumulated recorded conditions in said storage means to provide output signals indicative of the character read.

17. Apparatus for reading intelligence-bearing characters comprising means for sensing the area of a character to be read in rectilinear sensing increments progressing in parallelism with each other over the character area defining a sensing field and producing sensing signals characteristic of the characters sensed, means for processing the sensing signals to produce processed signals representing selected functions of the sensing signals, a plurality of successive time delay stages to delay said processed signals for successive time intervals, means responsive to predesignated combinations of signals derived from said time delay stages regardless of where the character is located in the scanning field for recognizing selected shapes to be identified corresponding to said combinations of signals including means for sampling said time delay stages to detect at one point in time a plurality of delayed processed signals which where applied to said time delay stages at different points in time, and means to provide an output signal indicative of the shape recognized.

18. Interpreter means for automatic character sensing apparatus for analyzing electrical signals characteristic of the characters derived from sensing of the characters as they pass through a sensing station to analyze the signals derived from a character in selective timed relation to each other, said interpreter means including delay means comprising a plurality of delay stages arranged in succession with the inputs of each stage following the first stage coupled to the output of the preceding stage, means for applying said characteristic signals to the input of the first delay stage, each delay stage producing delayed output signals substantially identical to the input signals applied thereto but delayed by a preselected time interval relative to the corresponding input signals, and sampling means intercoupled with the delay stages of said delay means for sampling the signals applied to said delay means at a plurality of selected delay stages of said delay means to sample at one point in time a plurality of delayed signals therein which were applied to said delay means at different points in time for sensing said signals in time referenced relation to each other.

19. Scanning apparatus for automatic character sensing equipment for producing scan signals characteristic of the characters on a character-bearing surface as the characters progress through a scanning station, comprising means for optically imaging onto character-bearing areas of the character-bearing surface within the scanning station a plurality of repetitive scanning patterns of light energy to be advanced in successive patterns laterally across the character-bearing area during advancement of the characters, each of said scanning patterns comprising at least a pair of laterally spaced scanning strokes extending vertically of the characters and spaced to span a fraction of the character width, said scanning strokes being of a length greater than the height of the characters, and the light energy being scanned from one end of the scanning strokes comprising a single scanning pattern to the other in laterally coordinated relation whereby the light energy progresses substantially simultaneously along the associated scan lines of a pattern, and means responsive to reflected light originating in the scanning pattern and reflected from said surface for detecting changes in the amount of light energy reflected from the surface and producing intercept and non-intercept scan signals respectively denoting the presence and absence of portions of the character intercepting said scan strokes.

References Cited in the file of this patent

UNITED STATES PATENTS

| | | |
|---|---|---|
| 1,815,996 | Weaver | July 28, 1931 |
| 1,870,989 | Eldred | Aug. 9, 1932 |
| 2,039,406 | Greensfelder | May 5, 1936 |
| 2,370,160 | Hansell | Feb. 27, 1945 |
| 2,615,992 | Flory | Oct. 28, 1952 |
| 2,616,983 | Zworykin | Nov. 4, 1952 |
| 2,624,798 | Dinga | Jan. 6, 1953 |
| 2,663,758 | Shepard | Dec. 22, 1953 |